US010215291B2

(12) United States Patent
Super (10) Patent No.: US 10,215,291 B2
(45) Date of Patent: Feb. 26, 2019

(54) REGULATING DEVICE (71) Applicant: Honeywell Technologies Sarl, Rolle (CH)

(72) Inventor: Willem Super, Emmen (NL)

(73) Assignee: Honeywell International Inc., Morris Plains, NJ (US)

( * ) Notice: Subject to any disclaimer, the term of this patent is extended or adjusted under 35 U.S.C. 154(b) by 4 days.

(21) Appl. No.: 15/593,070

(22) Filed: May 11, 2017

(65) Prior Publication Data
US 2017/0248250 A1 Aug. 31, 2017

Related U.S. Application Data (63) Continuation of application No. 14/505,079, filed on Oct. 2, 2014, now Pat. No. 9,683,674.

(30) Foreign Application Priority Data

Oct. 29, 2013 (EP) .................................... 13190674

(51) Int. Cl.
*F16K 31/128* (2006.01)
*F16K 7/12* (2006.01)
(Continued)

(52) U.S. Cl.
CPC ................ *F16K 7/12* (2013.01); *F16K 31/04* (2013.01); *F16K 31/128* (2013.01); *F23N 1/005* (2013.01);
(Continued)

(58) Field of Classification Search
CPC ......... Y10T 137/7765; Y10T 137/7766; Y10T 137/7769; Y10T 137/777; Y10T 137/7785;
(Continued)

(56) References Cited

U.S. PATENT DOCUMENTS 156,769 A  11/1874 Cameron
424,581 A   4/1890 Sickels
(Continued)

FOREIGN PATENT DOCUMENTS

DE  2509893  9/1976
DE  3638604  5/1988
(Continued)

OTHER PUBLICATIONS

"Flexible, Compact and with a High Performance—the New Valvario, G. Kromschroder AG Launches it's New, Improved Series of Gas Fittings," Press Release, 2 pages, 2003.
(Continued)

*Primary Examiner* — William McCalister (57) ABSTRACT

A regulating device may include a housing that defines an inlet chamber and an outlet chamber, with a flow restriction seat between the inlet chamber and the outlet chamber. A flow restriction valve is movable relative to the flow restriction seat to adjust the flow between the inlet chamber and the outlet chamber of the regulating device. A servo valve having a servo chamber may be used to adjust the position of the flow restriction valve. The servo chamber may be fluidly coupled to the inlet chamber though a fixed flow restriction and to the outlet chamber though an adjustable flow restriction. A stepper motor may be used to adjust the servo valve to adjust the adjustable flow restriction between the servo chamber and the outlet chamber. This causes a change of the servo pressure, which moves the flow restriction valve and adjusts the flow of the regulating device.

18 Claims, 5 Drawing Sheets

(51) Int. Cl.
  *F16K 31/04* (2006.01)
  *F23N 1/00* (2006.01)
(52) U.S. Cl.
  CPC ...... *F23N 2035/14* (2013.01); *F23N 2035/16* (2013.01); *F23N 2035/18* (2013.01); *F23N 2035/20* (2013.01); *Y10T 137/0396* (2015.04); *Y10T 137/777* (2015.04); *Y10T 137/7761* (2015.04); *Y10T 137/7765* (2015.04); *Y10T 137/7766* (2015.04); *Y10T 137/7791* (2015.04)
(58) Field of Classification Search
  CPC ......... Y10T 137/7788; Y10T 137/7791; Y10T 137/0396; Y10T 137/7761; F16K 7/12; F16K 31/04; F16K 31/128; F23N 2035/14; F23N 2035/16; F23N 2035/18; F23N 2035/20
  USPC .... 137/490, 491, 492, 492.5, 498, 501, 503; 251/30.03, 30.04, 30.05
  See application file for complete search history.

(56) References Cited

U.S. PATENT DOCUMENTS

| | | | |
|---|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,196,798 A | 4/1940 | Horstmann |
| 2,371,351 A | 3/1945 | Paille |
| 2,392,741 A | 1/1946 | Hurlburt |
| 2,403,692 A | 7/1946 | Tibbetts |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,414,010 A | 12/1968 | Sparrow |
| 3,641,373 A | 2/1972 | Elkuch |
| 3,646,969 A | 3/1972 | Stampfli |
| 3,744,754 A | 7/1973 | Demi |
| 3,769,531 A | 10/1973 | Elkuch |
| 3,803,424 A | 4/1974 | Smiley et al. |
| 3,809,313 A | 5/1974 | Branson |
| 3,810,578 A | 5/1974 | Matthews |
| 3,820,757 A | 6/1974 | Siebel |
| 3,838,810 A | 10/1974 | McMann et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,303,384 A | 12/1981 | Barnes |
| 4,355,606 A | 10/1982 | Casey |
| 4,360,955 A | 11/1982 | Block |
| 4,402,340 A | 9/1983 | Lockwood, Jr. |
| 4,406,131 A | 9/1983 | Weasel, Jr. |
| 4,413,975 A | 11/1983 | Turner et al. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,461,318 A | 7/1984 | Brakelmann |
| 4,478,076 A | 10/1984 | Bohrer |
| 4,478,077 A | 10/1984 | Bohrer et al. |
| 4,481,776 A | 11/1984 | Araki et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,609,176 A | 9/1986 | Powers |
| 4,619,438 A | 10/1986 | Coffee |
| 4,622,699 A | 11/1986 | Spriggs |
| 4,624,632 A | 11/1986 | Barnes et al. |
| 4,626,194 A | 12/1986 | Mills |
| 4,651,564 A | 3/1987 | Johnson et al. |
| 4,654,546 A | 3/1987 | Kirjavainen |
| 4,708,316 A | 11/1987 | Cook |
| 4,722,360 A | 2/1988 | Odajima et al. |
| 4,754,920 A | 7/1988 | Turner et al. |
| 4,756,508 A | 7/1988 | Giachino et al. |
| 4,815,699 A | 3/1989 | Mueller |
| 4,821,999 A | 4/1989 | Ohtaka |
| 4,829,826 A | 5/1989 | Valentin et al. |
| 4,832,070 A | 5/1989 | James et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,938,742 A | 7/1990 | Smits |
| 4,939,405 A | 7/1990 | Okuyama et al. |
| 4,995,585 A | 2/1991 | Gruber et al. |
| 5,000,220 A | 3/1991 | Eick et al. |
| 5,022,435 A | 6/1991 | Jaw-Shiunn |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,097,858 A | 3/1992 | Zlokovitz et al. |
| 5,108,623 A | 4/1992 | Cangelosi et al. |
| 5,129,794 A | 7/1992 | Beatty |
| 5,146,941 A | 9/1992 | Statler |
| 5,148,074 A | 9/1992 | Fujita et al. |
| 5,171,132 A | 12/1992 | Miyazaki et al. |
| 5,174,339 A * | 12/1992 | Pickard ................ G05D 7/0635 137/115.03 |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | Van Lintel |
| 5,224,843 A | 7/1993 | Van Lintel |
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,312,085 A | 5/1994 | Yokoyama et al. |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,385,328 A | 1/1995 | Hofmann |

(56) References Cited

U.S. PATENT DOCUMENTS

| | | |
|---|---|---|
| 5,407,128 A | 4/1995 | Schultz |
| 5,435,343 A | 7/1995 | Buezis |
| 5,441,597 A | 8/1995 | Bonne et al. |
| 5,449,142 A | 9/1995 | Banick |
| 5,452,878 A | 9/1995 | Gravesen et al. |
| 5,456,280 A * | 10/1995 | Palmer ................. B08B 15/023 137/501 |
| 5,460,196 A | 10/1995 | Yonnet |
| 5,477,877 A | 12/1995 | Schulze et al. |
| 5,499,909 A | 3/1996 | Yamada et al. |
| 5,503,549 A | 4/1996 | Iasella |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,634,490 A * | 6/1997 | Palmer ................. B08B 15/023 137/501 |
| 5,642,015 A | 6/1997 | Whitehead et al. |
| 5,676,342 A | 10/1997 | Otto et al. |
| 5,683,159 A | 11/1997 | Johnson |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitkiewicz |
| 5,774,372 A | 6/1998 | Berwanger |
| 5,792,957 A | 8/1998 | Luder et al. |
| 5,806,554 A | 9/1998 | Mieth |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,878,741 A | 3/1999 | Dempsey et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,080 A | 9/1999 | Leatherman |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,986,573 A | 11/1999 | Franklin et al. |
| 6,003,552 A | 12/1999 | Shank et al. |
| 6,029,705 A | 2/2000 | Happe |
| 6,047,718 A | 4/2000 | Konsky et al. |
| 6,047,730 A | 4/2000 | Coura et al. |
| 6,050,281 A | 4/2000 | Adams et al. |
| 6,057,771 A | 5/2000 | Lakra |
| 6,082,703 A | 7/2000 | Fava et al. |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,215,221 B1 | 4/2001 | Cabuz et al. |
| 6,230,736 B1 | 5/2001 | Schieble et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,293,300 B1 | 9/2001 | Dumke et al. |
| 6,297,640 B1 | 10/2001 | Hayes |
| 6,321,776 B1 | 11/2001 | Pratt et al. |
| 6,321,781 B1 | 11/2001 | Kurth |
| 6,349,742 B1 | 2/2002 | Borg et al. |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,536,287 B2 | 3/2003 | Beekhuizen et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | LaMarca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,748,977 B2 | 6/2004 | Berto |
| 6,768,406 B1 | 7/2004 | Fiaccabrino |
| 6,796,326 B2 | 9/2004 | Bayer |
| 6,811,100 B2 | 11/2004 | Bardinet et al. |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |

(56) References Cited

U.S. PATENT DOCUMENTS

| | | |
|---|---|---|
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,906,484 B1 | 6/2005 | Berroth et al. |
| 6,918,756 B2 | 7/2005 | Fredricks et al. |
| 6,923,069 B1 | 8/2005 | Stewart |
| 6,923,204 B2 | 8/2005 | Dalton et al. |
| 6,955,301 B2 | 10/2005 | Munsterhuis et al. |
| 6,955,486 B2 | 10/2005 | Kill et al. |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,994,114 B2 | 2/2006 | Ise et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |
| 7,011,110 B1 | 3/2006 | Stark |
| 7,039,502 B2 | 5/2006 | Berwanger et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,107,820 B2 | 9/2006 | Nunnally et al. |
| 7,119,504 B2 | 10/2006 | Dornhof |
| 7,121,525 B2 | 10/2006 | Gelez |
| 7,170,762 B2 | 1/2007 | Chian et al. |
| 7,174,771 B2 | 2/2007 | Cooper |
| 7,216,547 B1 | 5/2007 | Stewart et al. |
| 7,222,639 B2 | 5/2007 | Bonne et al. |
| 7,223,094 B2 | 5/2007 | Goebel |
| 7,225,056 B2 | 5/2007 | Bolduan et al. |
| 7,249,610 B2 | 7/2007 | Moses |
| 7,252,502 B2 | 8/2007 | Munsterhuis |
| 7,290,502 B2 | 11/2007 | Kidd et al. |
| 7,297,640 B2 | 11/2007 | Xie et al. |
| 7,302,863 B2 | 12/2007 | Kielb et al. |
| 7,317,265 B2 | 1/2008 | Chian et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,520,487 B2 | 4/2009 | Mattes |
| 7,543,604 B2 | 6/2009 | Benda |
| 7,553,151 B2 | 6/2009 | O'Mara et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhof |
| 7,624,755 B2 | 12/2009 | Benda et al. |
| 7,644,731 B2 | 1/2010 | Benda et al. |
| 7,669,461 B2 | 3/2010 | Kates |
| 7,688,011 B2 | 3/2010 | Berroth et al. |
| 7,715,168 B2 | 5/2010 | Gofman et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,066,255 B2 | 11/2011 | Wang |
| 8,109,289 B2 | 2/2012 | Trnka et al. |
| 8,205,484 B2 | 6/2012 | Sasaki |
| 8,225,814 B2 | 7/2012 | Igarashi |
| 8,240,636 B2 | 8/2012 | Smith |
| 8,265,794 B2 | 9/2012 | Minervini et al. |
| 8,271,141 B2 | 9/2012 | Cummings et al. |
| 8,307,845 B2 | 11/2012 | Kouchi et al. |
| 8,387,441 B2 | 3/2013 | Falta et al. |
| 8,639,464 B2 | 1/2014 | Artiuch et al. |
| 9,683,674 B2 | 6/2017 | Super |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0051754 A1* | 3/2003 | Kirkman ............... G05D 7/0126 137/501 |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0229976 A1* | 10/2005 | Kao ..................... G05D 7/0113 137/501 |
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tungl et al. |
| 2006/0228237 A1 | 10/2006 | Winkler |
| 2006/0243334 A1 | 11/2006 | Brochhaus et al. |
| 2006/0260701 A1 | 11/2006 | Mattes |
| 2006/0272712 A1 | 12/2006 | Sontag |
| 2006/0285067 A1 | 12/2006 | Kim |
| 2007/0024225 A1 | 2/2007 | Hahn et al. |
| 2007/0068511 A1 | 3/2007 | Bachinsky et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnoia et al. |
| 2007/0257628 A1 | 11/2007 | Gofman et al. |
| 2008/0035456 A1 | 2/2008 | Melchionn, Jr. |
| 2008/0099082 A1 | 5/2008 | Moenkhaus |
| 2008/0156077 A1 | 7/2008 | Flanders et al. |
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |
| 2009/0126798 A1 | 5/2009 | Mather |
| 2009/0146091 A1 | 6/2009 | Ams et al. |
| 2009/0148798 A1 | 6/2009 | Geiger et al. |
| 2009/0240445 A1 | 9/2009 | Umekage et al. |
| 2009/0280989 A1 | 11/2009 | Astra et al. |
| 2010/0018324 A1 | 1/2010 | Killian et al. |
| 2010/0043896 A1 | 2/2010 | Shock et al. |
| 2010/0064818 A1 | 3/2010 | Shubert |

(56) References Cited

U.S. PATENT DOCUMENTS

| | | |
|---|---|---|
| 2010/0074777 A1 | 3/2010 | Laufer et al. |
| 2010/0102259 A1 | 4/2010 | Forster |
| 2010/0180688 A1 | 7/2010 | Khemet et al. |
| 2010/0180882 A1 | 7/2010 | Oberhomburg et al. |
| 2010/0193045 A1 | 8/2010 | Xu |
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0046903 A1 | 2/2011 | Franklin |
| 2011/0080072 A1 | 4/2011 | Strobel et al. |
| 2011/0137579 A1 | 6/2011 | Seebauer |
| 2011/0240157 A1 | 10/2011 | Jones et al. |
| 2011/0266473 A1 | 11/2011 | Santinanavat et al. |
| 2013/0152673 A1 | 6/2013 | Young et al. |
| 2013/0153036 A1 | 6/2013 | Young et al. |
| 2013/0153041 A1 | 6/2013 | Kucera |
| 2013/0153042 A1 | 6/2013 | Young et al. |
| 2013/0153062 A1 | 6/2013 | Young et al. |
| 2013/0153798 A1 | 6/2013 | Kucera et al. |
| 2013/0154841 A1 | 6/2013 | Kucera et al. |
| 2014/0080075 A1 | 3/2014 | Young et al. |
| 2014/0096850 A1 | 4/2014 | Filkovski et al. |
| 2015/0107675 A1 | 4/2015 | Kucera |

FOREIGN PATENT DOCUMENTS

| | | |
|---|---|---|
| DE | 19525384 | 1/1997 |
| DE | 19617852 | 10/1997 |
| DE | 19826076 | 8/1999 |
| DE | 19824521 | 12/1999 |
| DE | 102005033611 | 10/2006 |
| DE | 102010051122 | 5/2012 |
| EP | 0174384 | 3/1986 |
| EP | 0230477 | 8/1987 |
| EP | 0275439 | 7/1988 |
| EP | 0282758 | 9/1988 |
| EP | 0356690 | 5/1993 |
| EP | 0545846 | 6/1993 |
| EP | 0563787 | 10/1993 |
| EP | 0617234 | 9/1994 |
| EP | 0522479 | 5/1996 |
| EP | 0744821 | 11/1996 |
| EP | 0645562 | 12/1996 |
| EP | 0678178 | 12/1996 |
| EP | 0664422 | 4/1997 |
| EP | 0665396 | 1/1998 |
| EP | 0822376 | 2/1998 |
| EP | 0817931 | 12/1998 |
| EP | 0652501 | 3/1999 |
| EP | 0907052 | 4/1999 |
| EP | 0817934 | 5/1999 |
| EP | 0896192 | 10/1999 |
| EP | 0952357 | 10/1999 |
| EP | 0757200 | 4/2000 |
| EP | 1031792 | 8/2000 |
| EP | 1069357 | 1/2001 |
| EP | 0896191 | 2/2001 |
| EP | 1084358 | 3/2001 |
| EP | 1106924 | 6/2001 |
| EP | 0881435 | 9/2001 |
| EP | 1186779 | 3/2002 |
| EP | 0976957 | 4/2002 |
| EP | 1157205 | 9/2002 |
| EP | 1121511 | 4/2003 |
| EP | 0992658 | 5/2003 |
| EP | 1323966 | 7/2003 |
| EP | 1078187 | 8/2003 |
| EP | 1084357 | 8/2003 |
| EP | 1382907 | 1/2004 |
| EP | 1403885 | 3/2004 |
| EP | 1413045 | 4/2004 |
| EP | 1424708 | 6/2004 |
| EP | 1176317 | 8/2004 |
| EP | 1269054 | 8/2004 |
| EP | 1484509 | 12/2004 |
| EP | 1073192 | 1/2005 |
| EP | 1191676 | 1/2005 |
| EP | 1275039 | 1/2005 |
| EP | 1499008 | 1/2005 |
| EP | 1446607 | 3/2005 |
| EP | 1510756 | 3/2005 |
| EP | 1299665 | 4/2005 |
| EP | 1324496 | 6/2005 |
| EP | 1535388 | 6/2005 |
| EP | 1584870 | 10/2005 |
| EP | 1243857 | 12/2005 |
| EP | 1282798 | 12/2005 |
| EP | 0843287 | 2/2006 |
| EP | 1346463 | 3/2006 |
| EP | 1659462 | 5/2006 |
| EP | 1703140 | 9/2006 |
| EP | 1703146 | 9/2006 |
| EP | 1183772 | 10/2006 |
| EP | 1303718 | 10/2006 |
| EP | 1314240 | 10/2006 |
| EP | 1256763 | 11/2006 |
| EP | 1727268 | 11/2006 |
| EP | 1559936 | 12/2006 |
| EP | 1748534 | 1/2007 |
| EP | 1748545 | 1/2007 |
| EP | 1327808 | 2/2007 |
| EP | 1329659 | 2/2007 |
| EP | 1291532 | 6/2007 |
| EP | 1610046 | 6/2007 |
| EP | 1592905 | 7/2007 |
| EP | 1610045 | 7/2007 |
| EP | 1727261 | 10/2007 |
| EP | 1860328 | 11/2007 |
| EP | 1882882 | 1/2008 |
| EP | 1626321 | 2/2008 |
| EP | 1848907 | 4/2008 |
| EP | 1936778 | 6/2008 |
| EP | 1536169 | 11/2008 |
| EP | 1298679 | 12/2008 |
| EP | 1714040 | 12/2008 |
| EP | 2014979 | 1/2009 |
| EP | 1669648 | 2/2009 |
| EP | 2048439 | 4/2009 |
| EP | 2107248 | 7/2009 |
| EP | 2093545 | 8/2009 |
| EP | 1715229 | 10/2009 |
| EP | 2116857 | 11/2009 |
| EP | 2119946 | 11/2009 |
| EP | 1370787 | 3/2010 |
| EP | 1413044 | 3/2010 |
| EP | 2164164 | 3/2010 |
| EP | 2177796 | 4/2010 |
| EP | 2178201 | 4/2010 |
| EP | 1970610 | 5/2010 |
| EP | 2197101 | 6/2010 |
| EP | 2068056 | 8/2010 |
| EP | 2212984 | 8/2010 |
| EP | 1712800 | 10/2010 |
| EP | 2118493 | 10/2010 |
| EP | 2242344 | 10/2010 |
| EP | 1715582 | 11/2010 |
| EP | 1675757 | 12/2010 |
| EP | 2267883 | 12/2010 |
| EP | 1703139 | 1/2011 |
| EP | 2286976 | 2/2011 |
| EP | 1596495 | 4/2011 |
| EP | 2306622 | 4/2011 |
| EP | 2010500 | 6/2011 |
| EP | 2113696 | 7/2011 |
| GB | 2099158 | 12/1982 |
| GB | 2327750 | 2/1999 |
| JP | 02-086258 | 3/1990 |
| JP | 05-219760 | 8/1993 |
| JP | 9061284 | 3/1997 |
| JP | 9184600 | 7/1997 |

(56) References Cited

FOREIGN PATENT DOCUMENTS

| | | |
|---|---|---|
| JP | 11230373 | 8/1999 |
| JP | 2004125809 | 4/2004 |
| JP | 2004309159 | 11/2004 |
| JP | 2008286478 | 11/2008 |
| SU | 744877 | 6/1980 |
| WO | WO 87/05375 | 9/1987 |
| WO | WO 96/27095 | 9/1996 |
| WO | WO 97/29538 | 8/1997 |
| WO | WO 99/24758 | 5/1999 |
| WO | WO 99/60292 | 11/1999 |
| WO | WO 99/64769 | 12/1999 |
| WO | WO 99/64770 | 12/1999 |
| WO | WO 00/28215 | 5/2000 |
| WO | WO 01/06179 | 1/2001 |
| WO | WO 01/33078 | 5/2001 |
| WO | WO 01/61226 | 8/2001 |
| WO | WO 01/73297 | 10/2001 |
| WO | WO 01/90617 | 11/2001 |
| WO | WO 02/04852 | 1/2002 |
| WO | WO 02/077502 | 10/2002 |
| WO | WO 02/084156 | 10/2002 |
| WO | WO 02/086365 | 10/2002 |
| WO | WO 02/086918 | 10/2002 |
| WO | WO 02/097840 | 12/2002 |
| WO | WO 2004/015314 | 2/2004 |
| WO | WO 2004/059830 | 7/2004 |
| WO | WO 2004/063609 | 7/2004 |
| WO | WO 2004/070245 | 8/2004 |
| WO | WO 2005/042313 | 3/2005 |
| WO | WO 2005/076455 | 8/2005 |
| WO | WO 2005/076456 | 8/2005 |
| WO | WO 2005/085652 | 9/2005 |
| WO | WO 2005/094150 | 10/2005 |
| WO | WO 2006/000366 | 1/2006 |
| WO | WO 2006/000367 | 1/2006 |
| WO | WO 2006/053816 | 3/2006 |
| WO | WO 2006/039956 | 4/2006 |
| WO | WO 2006/042635 | 4/2006 |
| WO | WO 2006/077069 | 7/2006 |
| WO | WO 2006/088367 | 8/2006 |
| WO | WO 2007/012419 | 2/2007 |
| WO | WO 2007/093312 | 8/2007 |
| WO | WO 2007/140927 | 12/2007 |
| WO | WO 2008/061575 | 3/2008 |
| WO | WO 2008/039061 | 4/2008 |
| WO | WO 2008/119404 | 10/2008 |
| WO | WO 2008/141911 | 11/2008 |
| WO | WO 2008/148401 | 12/2008 |
| WO | WO 2009/000481 | 12/2008 |
| WO | WO 2009/049694 | 4/2009 |
| WO | WO 2009/065815 | 5/2009 |
| WO | WO 2009/073510 | 6/2009 |
| WO | WO 2009/089857 | 7/2009 |
| WO | WO 2009/126020 | 10/2009 |
| WO | WO 2010/018192 | 2/2010 |
| WO | WO 2010/052137 | 5/2010 |
| WO | WO 2010/056111 | 5/2010 |
| WO | WO 2010/083877 | 7/2010 |
| WO | WO 2011/010274 | 1/2011 |
| WO | WO 2011/045776 | 4/2011 |
| WO | WO 2011/047895 | 4/2011 |
| WO | WO 2011/051002 | 5/2011 |
| WO | WO 2011/069805 | 6/2011 |
| WO | WO 2011/072888 | 6/2011 |
| WO | WO 2011/092011 | 8/2011 |
| WO | WO 2011/095928 | 8/2011 |

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.

ASCO RedHat, "2-Way Normally Closed General Purpose & Watertight Enclosure Gas Shutoff Valves ¾" to 3" NPT, ⅔ Series 8214 (200)," 8 pages, prior to Dec. 15, 2011.
ASCO RedHat, "2-Way Normally Closed General Purpose & Watertight Enclosure Gas Shutoff Valves ¾" to 3" NPT, ⅔ Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. on Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
European Search Report for EP Application No. 13190674.5 dated Jan. 20, 2014.
Examination Report for EP Application No. 12196398.7, dated Apr. 11, 2014.
CSA, "B149.3S1-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65—DN100," 8 pages, prior to Dec. 15, 2011.
Dungs Combustion Controls, "Double Solenoid Valve Control and Safety Combination Valve Servo Pressure Controller, DMV-SE 507/11—525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.

(56) References Cited

OTHER PUBLICATIONS

Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics", IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas Vas," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE , pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U.. Gas Valve Actuator with Safety Shutoff Function," Document No. 155-751 SKP15 . . . U.., 5 pages, Jul. 1, 2005.
Siemens Building Technologies, Inc., "SKP25 . . . U.. Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U.. Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Wagner et al., "Bistable Microvalve with Pneumatically Coupled Membranes," IEEE, pp. 384-388, 1996.
www.combustion911.com/products/valve-proving-controls-tc-410. html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.

\* cited by examiner

Fig. 2

REGULATING DEVICE

This is a continuation of U.S. patent application Ser. No. 14/505,079, filed on Oct. 2, 2014, entitled "REGULATING DEVICE", which claims priority to European Patent Application No. 13 190 674.5, filed on Oct. 29, 2013, entitled "REGULATING DEVICE", both of which are incorporated herein by reference.

TECHNICAL FIELD

The present patent application relates to a regulating device, preferably to a gas regulating device.

BACKGROUND

DE 198 21 853 A1 discloses a gas regulating device comprising a housing providing a gas inlet chamber and a gas outlet chamber. The gas regulating device further comprises gas valves, namely a main gas valve, a safety gas valve and a servo gas valve. The servo gas valve is part of a servo pressure regulator.

SUMMARY

Against this background, the present application provides a regulating device. The regulating device according to the present application comprises at least a housing, a flow restriction valve, a servo valve and a stepper motor. The flow restriction valve and the servo valve are positioned within the housing. Preferably they are coaxially aligned. The housing provides a first chamber in which a first pressure is present and a second chamber in which a second pressure is present. The flow restriction valve comprises a valve body acting together with a flow restriction seat, wherein the flow restriction valve adjusts the flow from the first chamber into the second chamber. The servo valve comprises a valve body attached to a membrane, wherein the membrane defines a servo chamber in which a servo pressure is present, wherein the servo chamber is connected to the first chamber though a fixed flow restriction element, and wherein the servo chamber is connected to the second chamber though an adjustable flow restriction element. The stepper motor is used for moving the valve body of the servo valve thereby adjusting the adjustable flow restriction element. The adjustment of the adjustable flow restriction element causes a change of the servo pressure present in the servo chamber which is used to move the flow restriction valve to a position reflecting a defined flow resistance between the valve body of the flow restriction valve (20) and the flow restriction seat.

The invention makes it possible to regulate the flow restriction valve, which is partly unbalanced because of different pressure levels in the system, with a stepper motor. The position of the servo valve may be direct driven by the stepper motor. The position of the flow restriction valve is driven by the pressure within the servo chamber and positioned at a defined position relative to the servo valve. An advantage of a direct driven position of the servo valve by the stepper motor is that position and level of flow restriction are precisely defined and controlled.

This invention enables defined opening and micro-positioning. This invention rules out overshoot in flow regulation, oscillation and/or nervous behaviour that are typical for pneumatic regulation systems.

This invention enables situation dependent regulation behaviour. For instance instabilities during an ignition phase can be filtered or completely ignored. Regardless of the position of the servo valve, the flow restriction valve always seeks for equilibrium of axial forces.

When the stepper motor is rotated in a first direction, the valve body of the servo valve is moved in a first direction thereby decreasing or closing the adjustable flow restriction element, thereby changing the servo pressure present in the servo chamber towards the first pressure present in the first chamber and thereby increasing or alternatively decreasing flow resistance over flow restriction valve and thereby decreasing or alternatively increasing flow over the flow restriction valve from the first chamber into the second chamber. When the stepper motor is rotated in a second direction, the valve body of the servo valve is moved in a second direction thereby increasing or opening the adjustable flow restriction element, thereby changing the servo pressure present in the servo chamber towards the second pressure present in the second chamber and thereby decreasing or alternatively increasing flow resistance over flow restriction valve and thereby increasing or alternatively decreasing flow over the flow restriction valve from the first chamber into the second chamber. The position of the servo valve is defined as described above by the stepper motor. With the position of the servo valve and the equilibrium distance between flow restriction valve and servo valve, the position of flow restriction valve and hence flow resistance is precisely defined and controlled.

Preferably, the membrane is positioned between a first membrane support plate and a second membrane support plate. The valve body of the flow restriction valve may be coupled to the first membrane support plate through a hollow valve stem. A servo flow channel provided by the hollow valve stem, by the valve body of the servo valve and by the first membrane support plate, is coupled to the first chamber though the fixed flow restriction element, to the second chamber though the adjustable flow restriction element and to the servo chamber. The fixed flow restriction element is provided by an opening in the valve body of the flow restriction valve or by an opening in the valve stem. The adjustable flow restriction element is defined by the valve body of the servo valve and by the first membrane support plate. The valve body of the servo valve is moveable relative to the first membrane support plate thereby adjusting the adjustable flow restriction element. This design is simple and reliable.

BRIEF DESCRIPTION OF THE FIGURES

Preferred developments of the invention are provided by the description which follows. Exemplary embodiments are explained in more detail on the basis of the drawing, in which.

DESCRIPTION

Figure 1:
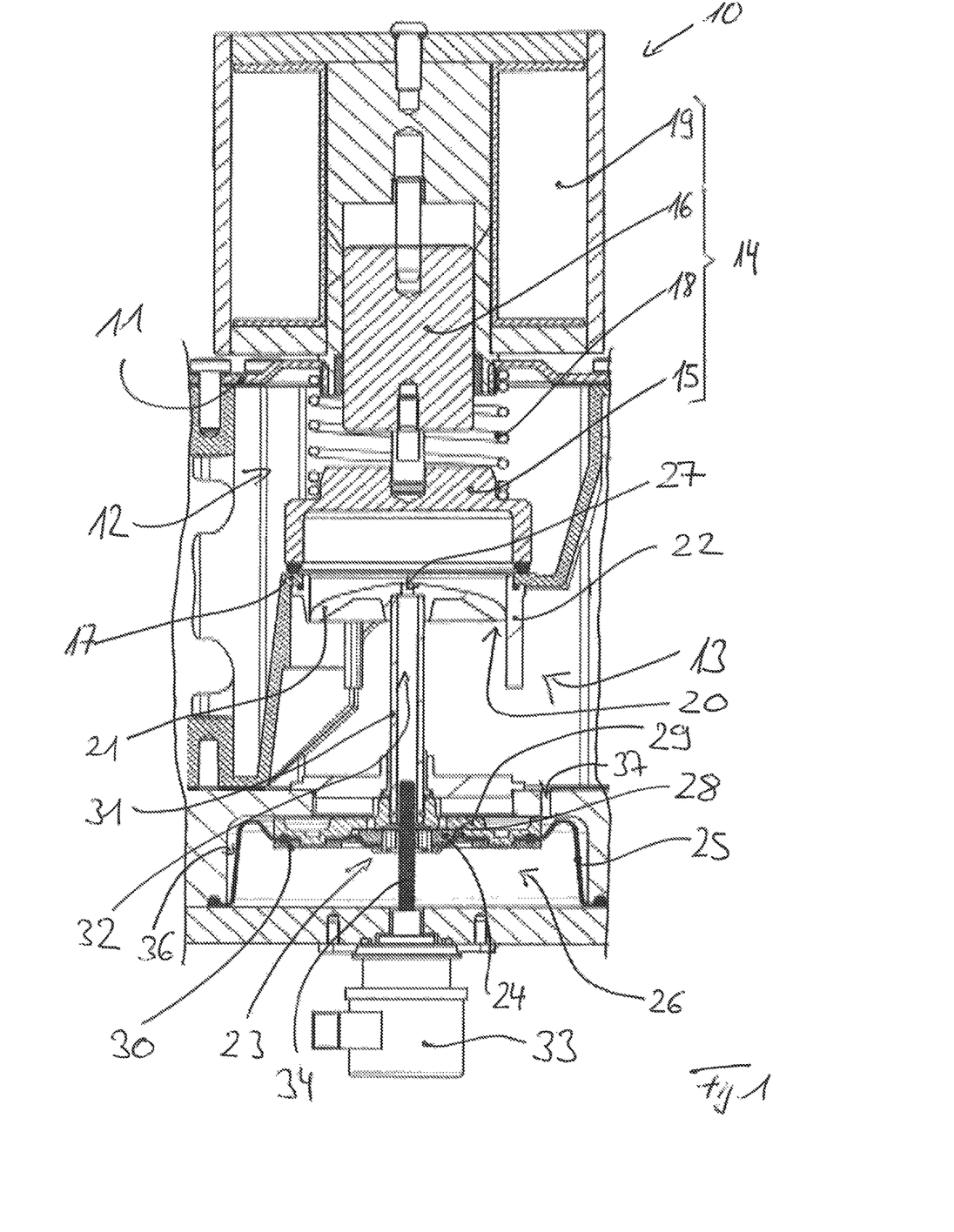
FIG. 1 shows a cross sectional view of an illustrative gas regulating device.

FIGS. 1 though 5 show illustrative embodiments of gas regulating devices. The use of the invention in connection with gas regulating devices is preferred. However, the invention can also be used in connection with regulating devices for other mediums like water or cooling agents.

FIG. 1 shows a cross sectional view of an illustrative gas regulating device 10. The illustrative gas regulating device 10 comprises a housing 11 providing a first chamber 12, hereinafter called first gas chamber, in which a first gas pressure is present, and a second chamber 13, hereinafter called second gas chamber, in which a second gas pressure is present. The first chamber 12 can also be called an inlet chamber and the second chamber 13 can also be called an outlet chamber. The first gas pressure present in the first gas chamber 12 can also be called an inlet gas pressure and the second gas pressure present in the second gas chamber 13 can also be called an outlet gas pressure.

The illustrative gas regulating device 10 may further comprise a safety shut-off valve 14 positioned in the housing 10. Other regulating devices for other mediums like water or cooling agents may not comprise such a safety shut-off valve 14.

The illustrative safety shut-off valve 14 comprises a valve body 15 carried by a valve stem 16. The valve body 15 of the safety shut-off valve 14 acts together with a valve seat 17 provided by the housing 11. The valve body 15 of the safety shut-off valve 14 is pressed against the valve seat 17 by a spring element 18 of the safety shut-off valve 14. The valve body 15 of the safety shut-off valve 14 can be lifted up from the valve seat 17 against the force of the spring element 18 by an actuator 19, namely by energizing a magnetic coil.

A gas flow from the first gas chamber 12 into the second gas chamber 13 is impossible when the valve body 15 of the safety shut-off valve 14 is pressed against the valve seat 17 provided by the housing 11. A gas flow from the first gas chamber 12 into the second gas chamber 13 is possible when the valve body 15 of the safety shut-off valve 14 is lifted up from the valve seat 17 provided by the housing 11.

The gas regulating device 10 further comprises a flow restriction valve 20 positioned in the housing 11. The flow restriction valve 20 comprises a valve body 21 acting together with a flow restriction seat 22 provided by the housing 11. It is also possible that the flow restriction seat 22 is not provided by the housing 11 but by a different part placed inside the housing 11. The flow restriction valve 20 adjusts the gas flow from the first gas chamber 12 into the second gas chamber 13 when the valve body 15 of the safety shut-off valve 14 is lifted up from the valve seat 17 provided by the housing 11.

Figure 2:
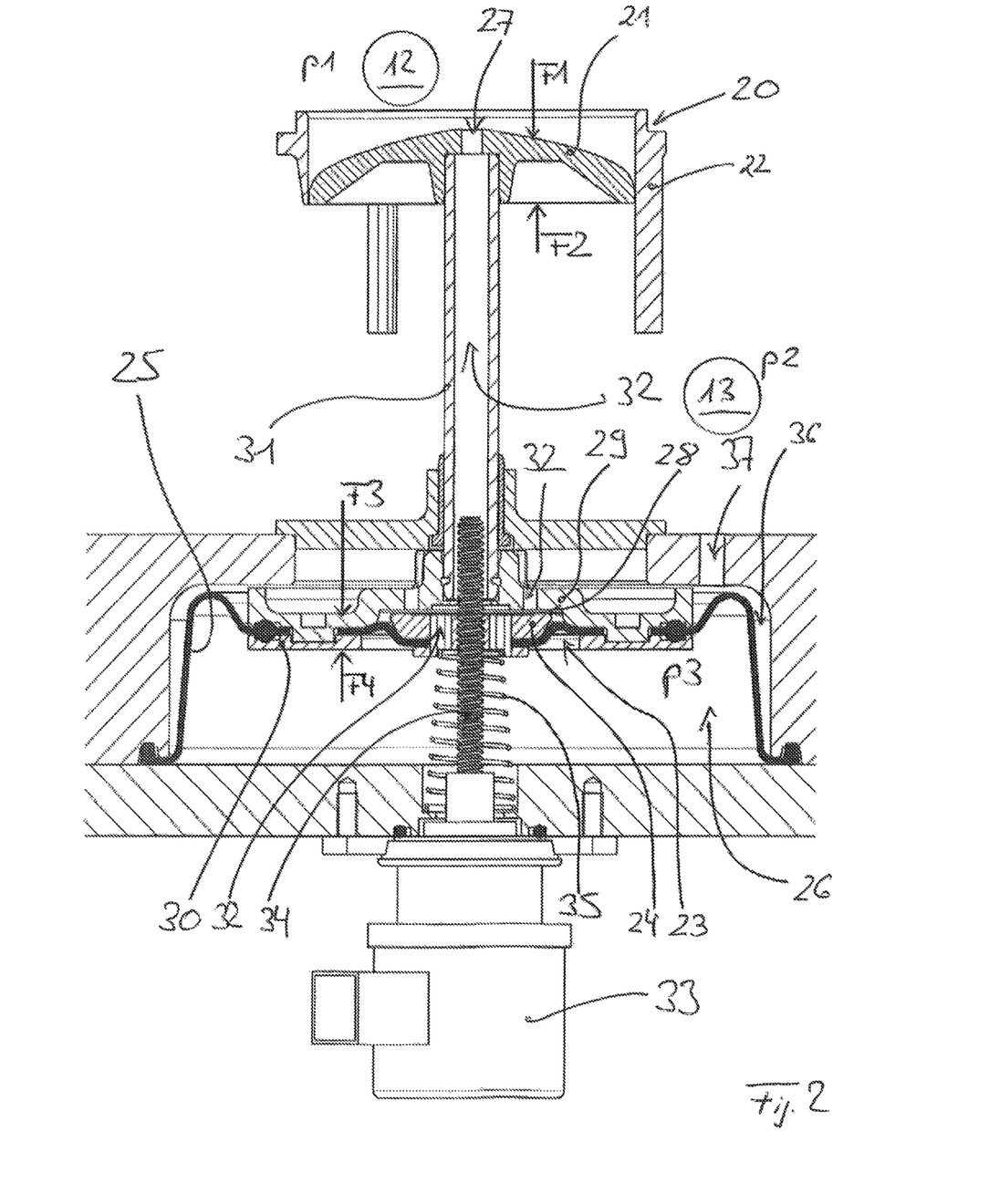
FIG. 2 shows a detailed view of part of FIG. 1 in a first state.
Figure 3:
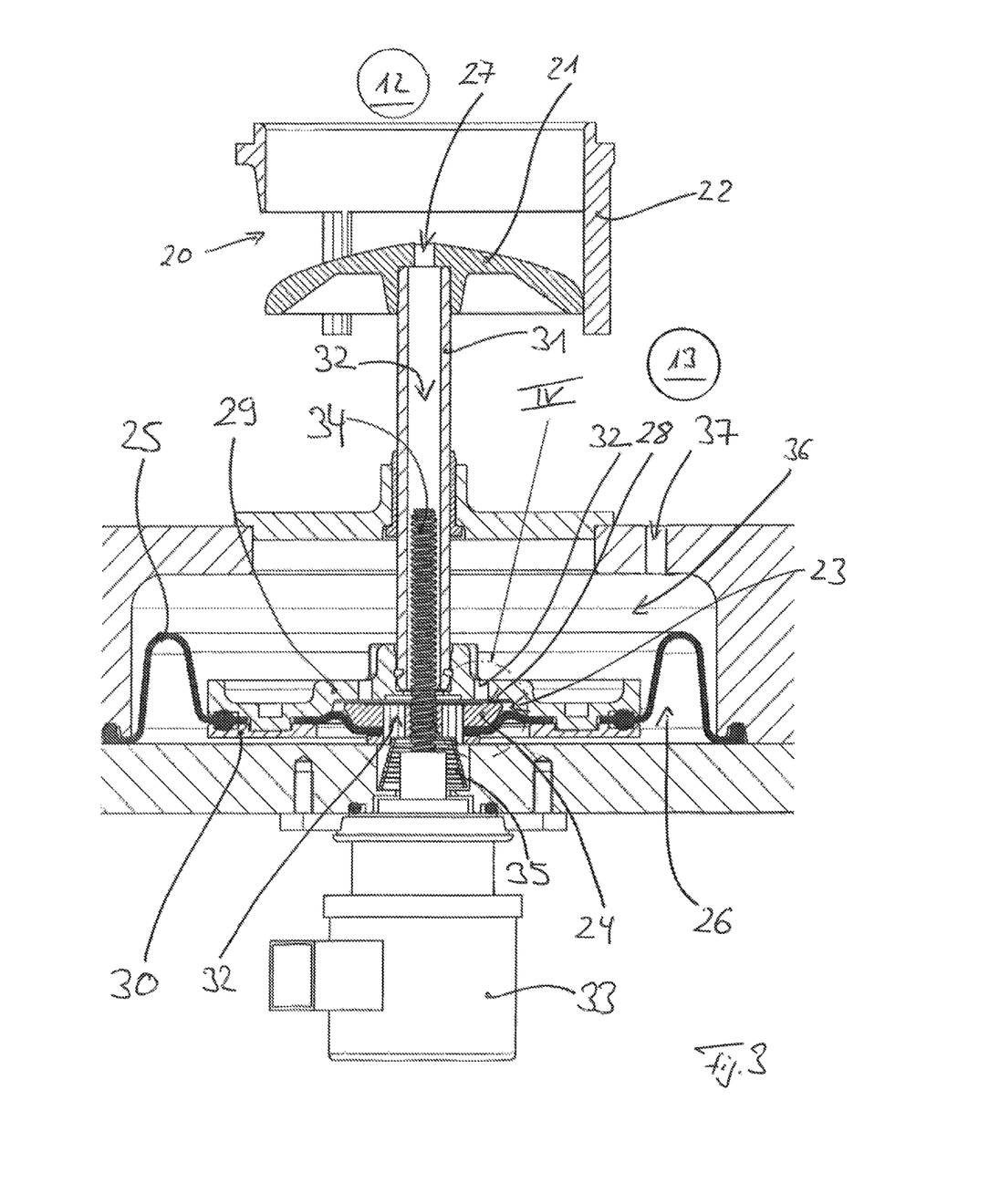
FIG. 3 shows the detailed view of FIG. 2 in a second state.

FIGS. 1 and 2 show the flow restriction valve 20 in a relatively closed state and FIG. 3 shows the flow restriction valve 20 in a relatively opened state. In both states, the flow restriction valve 20 allows a gas flow from the first gas chamber 12 into the second gas chamber 13, namely in the state of FIGS. 1 and 2 a relatively small or relatively low gas flow and in the state of FIG. 3 a relatively big or relatively high gas flow.

The illustrative flow restriction valve 20 is shown coaxially aligned to the safety shut-off valve 14. Coaxial alignment of flow restriction valve 20 and safety shut-off valve 14 is optional. The invention would also work when the same are eccentric placed or when the flow restriction valve 20 is placed at an angle in respect to the shut-off valve 14.

The illustrative gas regulating device 10 further comprises a servo valve 23 positioned in the housing 11. The servo valve 23 comprises a valve body 24 attached to a membrane 25. The membrane 25 defines a servo gas chamber 26 in which a servo gas pressure is present. The servo gas chamber 26 is connected to the first (inlet) gas chamber 12 though a fixed flow restriction element, hereinafter called fixed orifice 27. The servo gas chamber 26 is also connected to the second (outlet) gas chamber 13 though an adjustable flow restriction element, hereinafter called adjustable orifice 28.

The illustrative membrane 25 is positioned between a first, upper membrane support plate 29 and a second, lower membrane support plate 30. The illustrative servo valve 23 including the valve body 24, the membrane 25 and the membrane support plates 29, 30 is shown positioned in a space defined by a lower housing section, wherein the membrane 25 divides that space, with the servo gas chamber 26 positioned below the membrane 25 and a gas chamber 36 positioned above the membrane 25.

The gas chamber 36 positioned above the membrane 25 is shown connected with the second gas chamber 13 by an opening 37 in the housing 11 so that the same gas pressure is present within the gas chamber 36 positioned above the membrane 25 and the second gas chamber 13.

Figure 4:
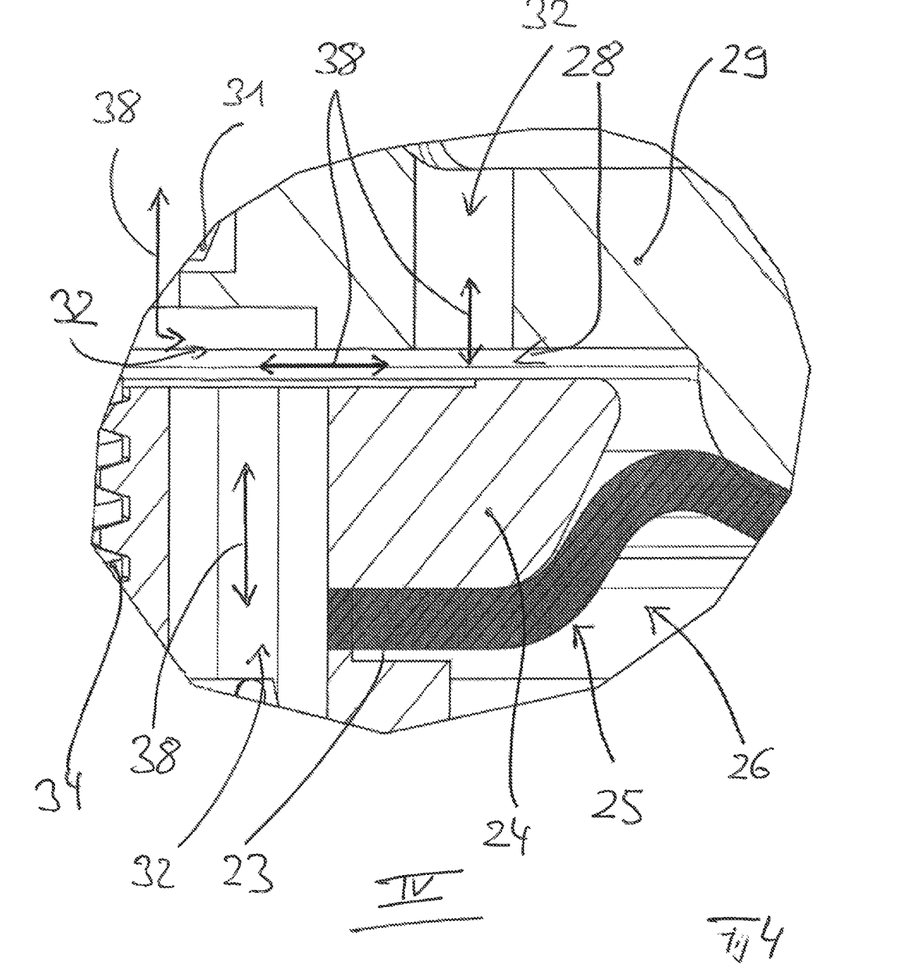
FIG. 4 shows the detailed view of part of FIG. 3.

The illustrative valve body 21 of the flow restriction valve 20 is mechanically coupled to the first membrane support plate 29 through a hollow valve stem 31. In some instances, valve stem 31 and first membrane support plate 29 can be provided by one single part. In the embodiment shown, a servo gas flow channel 32 is provided by the hollow valve stem 31, by the valve body 24 of the servo valve 23 and by the first membrane support plate 29. The servo gas flow channel 32 is coupled to the first gas chamber 12 through the fixed orifice 27, is coupled to the second gas chamber 13 through the adjustable orifice 28, and is coupled to the servo gas chamber 26. The servo gas chamber 26 is connected to the servo gas flow channel 32 between the fixed orifice 27 and the adjustable orifice 28. FIG. 4 illustrates the servo gas flow 38 though the servo gas flow channel 32 between the chambers 12, 13, 26. The area above the membrane 25 around the servo valve 23 is connected with the servo pressure, which occurs between the fixed orifice 27 and adjustable orifice 28.

The fixed orifice 27 is provided by an opening in the valve body 21 of the flow restriction valve 20. Alternatively, the fixed orifice 27 is provided by an opening in the valve stem 31. In the embodiment shown, the adjustable orifice 28 is provided by the valve body 24 of the servo valve 23 and by the first membrane support plate 29. The servo valve 23 is shown coaxially aligned to safety shut-off valve 14 and to the flow restriction valve 20, but this is not required.

The illustrative gas regulating device 10 further comprises a gas tight stepper motor 33 for moving the valve body 24 of the servo valve 23 thereby adjusting the adjustable orifice 28. The stepper motor 33 acts together with a spindle 34 and a threaded section of the valve body 24 of the servo valve 23. By rotating the stepper motor 33 the spindle 34 becomes rotated, whereby an outer thread of the spindle 34 engages with an inner thread of the threaded section of the valve body 24 thereby causing a linear movement of the valve body 24 of the servo valve 23.

In this case, the membrane 25 prevents the servo valve 23 for rotating with the spindle 34. It is also possible to use other means like a pin, to prevent the servo valve 23 from rotating with the spindle 34. The spindle 34 converts the rotation of the stepper motor 33 into a linear movement of the valve body 24 of the servo valve 23. So, in the illustrative embodiment, the valve body 24 of the servo valve 23 is moveable relative to the first membrane support plate 29 by the stepper motor 33 thereby adjusting the adjustable orifice 28.

A spring element 35 acts on the valve body 24 of the servo valve 23. This spring element 35 is optional, to push any axial play in the stepper motor 33, or between the spindle 34 and the threaded section of the valve body 24 to one side. The spring element 35 does not have a supporting function towards linear movement of the valve body 24 of the servo valve 23.

Regardless of the position of the servo valve 23, the flow restriction valve 20 always seeks for equilibrium of axial forces. In FIG. 2 the axial forces F1, F2, F3 and F4 acting on the pressure regulation valve 20 and on the servo valve 23 are shown, whereby the axial forces F1, F2, F3 and F4 depend on the pressure p1 within the first gas chamber 12, the pressure p2 within the second gas chamber 13 and the servo gas pressure p3 within the servo gas chamber as follows:

$$F1=p1*A1$$

$$F2=p2*A2$$

$$F3=p2*A3$$

$$F4=P3*A4$$

wherein A1, A2 are the effective areas of the valve body 21, and wherein A3, A4 are the effective areas of the support plates 29, 30 and membrane 25. A1 might be equal to A2 and A3 might be equal to A4.

Assuming that an additional undefined force F5 is acting on the flow restriction valve 20, in a static situation the following scenarios are possible:

(1) The resulting force FR=F1−F2+F3−F4+F5>0: Then the flow restriction valve 20 is pushed downwards towards the servo valve 23 which has a defined position which is fixed by the spindle 34 for the moment. Result of this movement is the opening of that adjustable orifice 28 decreases and the flow resistance increases through adjustable orifice 28. Because of this increased flow resistance, servo pressure p3 will increase towards pressure p1, and force F4 will increase accordingly. Resulting force FR will decrease towards zero.

(2) The resulting force FR=F1−F2+F3−F4+F5<0: Then the flow restriction valve 20 is pushed upwards away from the servo valve 23 which has a defined position. Result of this movement is that opening of the adjustable orifice 28 increases and the flow resistance decreases through the adjustable orifice 28. Because of this decreased flow resistance, servo pressure p3 will decrease towards pressure p2 and force F4 will decrease accordingly. Resulting force FR will increase towards zero.

If resulting force FR is not equal to zero, the servo pressure p3 will change to compensate for any unbalance.

In a dynamic situation, the following scenarios are possible:

(1) When the stepper motor 33 is rotated in a first direction, the valve body 24 of the servo valve 23 is moved in a first direction towards the flow restriction valve 20: thereby decreasing or closing the adjustable orifice 28; thereby changing the servo gas pressure present in the servo gas chamber 26 towards the first gas pressure present in the first gas chamber 12; thereby creating a resulting force that acts on the membrane 25 and flow restriction valve 20 in the same direction as the moving direction of the servo valve 23; thereby moving the flow restriction valve 20 in the same direction as the moved servo valve 23, away from the servo valve 23; thereby restoring increasing or opening the adjustable orifice 28; thereby restoring servo pressure p3; thereby restoring equilibrium of forces; thereby increasing the flow resistance over flow restriction valve 20; and thereby decreasing the gas flow over the flow restriction valve 20 from the first gas chamber 12 into the second gas chamber 13. With such an actuation, the gas regulating device 10 can be transferred from the state shown in FIG. 3 into the state shown in FIGS. 1 and 2.

(2) When the stepper motor 33 is rotated in a second direction, the valve body 24 of the servo valve 22 is moved in a second direction opposite to the above first direction: thereby increasing or opening the adjustable orifice 28; thereby changing the servo gas pressure present in the servo gas chamber 26 towards the second gas pressure present in the second gas chamber 13; thereby creating a resulting force that acts on the membrane 25 and flow restriction valve 20 in the opposite direction as the moving direction of the servo valve 23; thereby moving the flow restriction valve 20 in the opposite direction as the moved servo valve 23; thereby restoring decreasing or closing the adjustable orifice 28; thereby restoring servo pressure p3; thereby restoring equilibrium of forces; thereby decreasing flow resistance over flow restriction valve 20; and thereby increasing gas flow over the flow restriction valve 20 from the first gas chamber 12 into the second gas chamber 13. With such an actuation, the gas regulating device 10 can be transferred from the state shown in FIGS. 1 and 2 into the state shown in FIG. 3.

The above actuations are initiated by rotating the stepper motor 33 and thereby moving the valve body 24 of the servo valve 23. The movements of the valve body 24 of the servo valve 23 cause a pressure change within the servo gas chamber 26. This pressure change within the servo gas chamber 26 finally causes the movement of the valve body 21 of the flow restriction valve 20, and thereby changes the gas flow over the flow restriction valve 20 from the first gas chamber 12 into the second gas chamber 13. The position of the flow restriction valve 20 depends on the position of the servo gas valve 23.

The adjustment of the position of the valve body 21 of the flow restriction valve 20 and thereby the adjustment of the flow resistance over the flow restriction valve 20 takes place until the system is in equilibrium. In equilibrium, the flow restriction valve 20 is in force equilibrium and flow equilibrium, meaning that resultant forces that act on the restriction valve 20 are zero and that the servo flow 23 that exits the servo chamber 26 via the adjustable orifice 28 equals the servo flow that enters the servo chamber 26 via the fixed orifice 27. Servo flow that exits the servo chamber 26 via the adjustable orifice 28 defines the distance between the servo valve 23 and the upper support plate 29 precisely.

The illustrative gas regulating device 10 comprises the flow restriction valve 20 positioned inside, above or below a flow port of safety shut-off valve 14. The illustrative gas regulating device 10 provides three levels of pressure, namely first/inlet gas pressure, second/outlet gas pressure and servo gas pressure. The first/inlet gas pressure is input from the system. The second/outlet gas pressure is the result of the position of the flow restriction valve 20.

Inside the flow restriction valve 20 is the servo gas valve 23 positioned such that it can manipulate the servo gas pressure level by opening or closing the adjustable outlet orifice 28 to make use of that servo gas pressure for moving or positioning the flow restriction valve 20 at a defined distance from that servo gas valve 23. The position of that servo gas valve 23 is defined by the stepper motor 23. With the position of the servo gas valve 23 and the defined distance between flow restriction valve 20 and servo gas valve 23, the position flow restriction valve 20 and hence flow resistance over the flow restriction valve 20 is precisely defined and controlled.

In some cases, the second gas pressure present within the second gas chamber 13 can be measured by a sensor (not shown). In this case, the stepper motor 33 may be operated on basis on the pressure measured by said sensor in such a way that the second gas pressure within the second gas chamber 13 is kept constant at a defined level.

In this case, the flow restriction valve 20 is used as a pressure controller. Alternatively, it is also possible to measure the gas flow through the gas regulating device and to operate stepper motor 33 to keep the gas flow constant. In this case, the flow restriction valve 20 is used as a flow controller.

In the illustrative embodiment shown in FIGS. 1 to 4, the flow restriction valve 20 and the safety shut-off valve 14 become opened in opposite directions. In FIGS. 1 to 4, the safety shut-off valve 14 is moved upwards to become opened and flow restriction valve 20 is moved downwards to become opened. So, in FIGS. 1 to 4, the flow restriction valve 20 opens in the direction of the gas flow through the valve set 17 when the safety shut-off valve 14 is opened.

Figure 5:
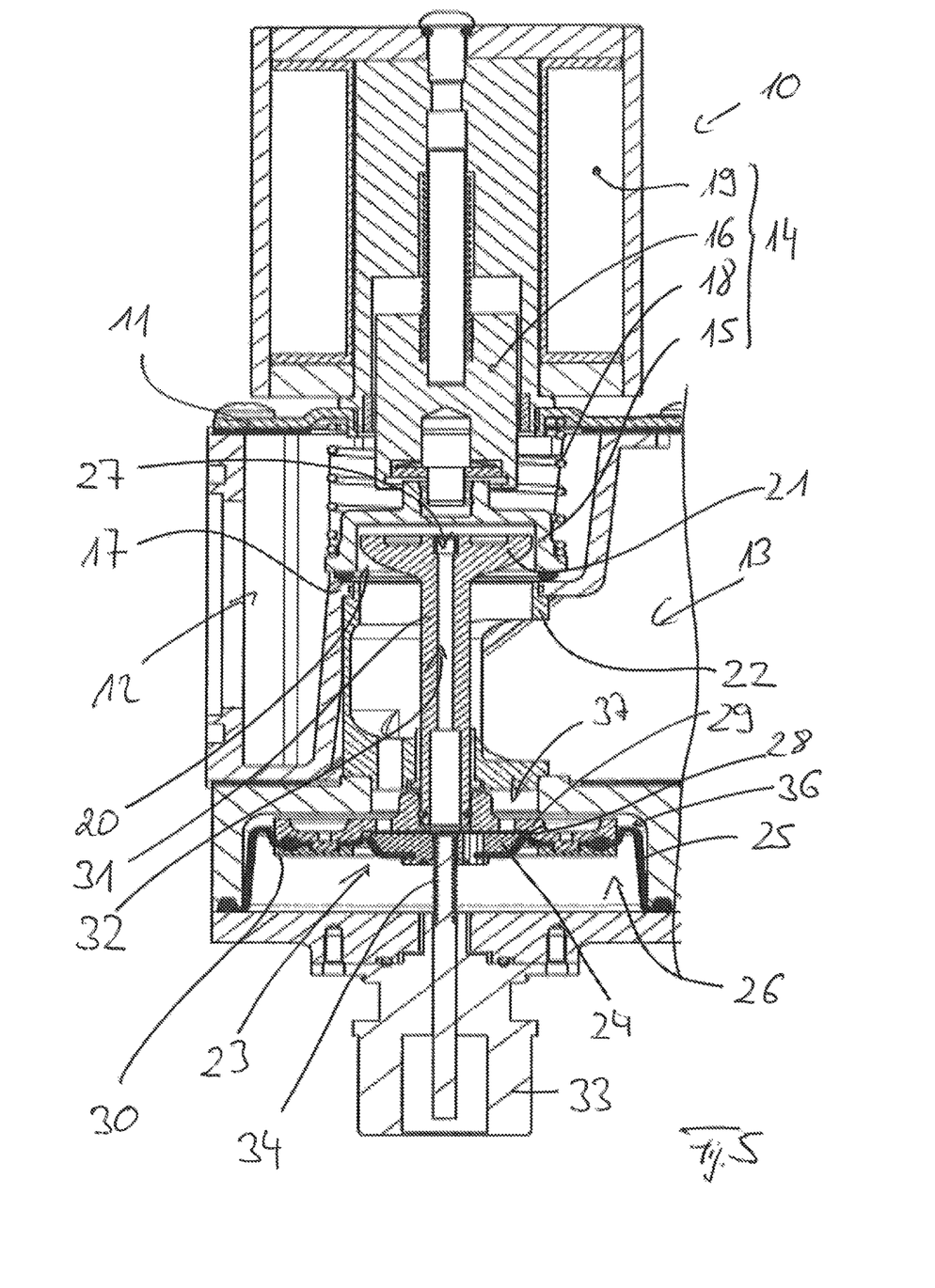
FIG. 5 shows a cross sectional view of another illustrative gas regulating device.

FIG. 5 shows an illustrative embodiment of a gas regulating device 10 in which the flow restriction valve 20 and the safety shut-off valve 14 become opened in the same direction. In FIG. 5, the safety shut-off valve 14 and the flow restriction valve 20 are both moved upwards to become opened. So, in FIG. 5 the flow restriction valve 20 opens in the opposite direction of the gas flow through the valve set 17 when the safety shut-off valve 14 is opened.

In this case the following applies: When the stepper motor is rotated in a first direction, the valve body of the servo valve is moved in a first direction thereby decreasing or closing the adjustable flow restriction element, thereby changing the servo pressure present in the servo chamber towards the first pressure present in the first chamber and thereby decreasing flow resistance over flow restriction valve and thereby increasing flow over the flow restriction valve from the first chamber into the second chamber. When the stepper motor is rotated in a second direction, the valve body of the servo valve is moved in a second direction thereby increasing or opening the adjustable flow restriction element, thereby changing the servo pressure present in the servo chamber towards the second pressure present in the second chamber and thereby increasing flow resistance over flow restriction valve and thereby decreasing flow over the flow restriction valve from the first chamber into the second chamber. The position of the servo valve is defined as described above by the stepper motor. With the position of the servo valve and the equilibrium distance between flow restriction valve and servo valve, the position of flow restriction valve and hence flow resistance is precisely defined and controlled. All other details are the same. For that, identical reference signs are used and reference is made to the description of FIGS. 1 to 4.

LIST OF REFERENCE SIGNS 10 gas regulating device
11 housing
12 first/inlet gas chamber
13 second/outlet gas chamber
14 safety shut-off valve
15 valve body
16 valve stem
17 valve seat
18 spring element
19 actuator
20 flow restriction valve
21 valve body
22 flow restriction seat
23 servo valve
24 valve body
25 membrane
26 servo gas chamber
27 fixed orifice
28 adjustable orifice
29 first, upper membrane support plate
30 second, lower membrane support plate
31 valve stem
32 servo gas flow channel
33 stepper motor
34 spindle
35 spring element
36 gas chamber
37 opening
38 gas flow

What is claimed is:

1. A gas regulating device, comprising
a housing defining a gas inlet chamber having a gas inlet pressure and a gas outlet chamber having a gas outlet pressure, the housing further having a flow restriction seat that defines a flow path between the gas inlet chamber and the gas outlet chamber that extends along a flow axis;
a flow restriction valve movable relative to the flow restriction seat to adjust a flow between the gas inlet chamber and the gas outlet chamber in the flow path, wherein the flow restriction valve is movable along the flow axis of the flow path;
a servo valve including:
a valve body attached to a membrane, wherein the membrane defines at least part of the servo chamber in which the servo pressure is present and the membrane positioned between a first membrane support plate and a second membrane support plate;
a servo chamber in which a servo pressure is present, wherein the servo chamber is fluidly coupled to the gas inlet chamber through a fixed orifice and to the gas outlet chamber through an adjustable orifice; and
a stepper motor for adjusting the adjustable orifice between the servo chamber and the gas outlet chamber, which is configured to cause a change of the servo pressure present in the servo chamber, which is configured to move the flow restriction valve relative to the flow restriction seat along the flow axis to thereby adjust the flow between the gas inlet chamber and the gas outlet chamber of the housing,
wherein the fixed orifice is provided by an opening in the flow restriction valve, and the adjustable orifice is defined by the valve body of the servo valve and by the first membrane support plate.

2. The gas regulating device of claim 1, wherein:
when the stepper motor is driven in a first direction, the servo valve is moved in a first direction thereby decreasing or closing the adjustable orifice, thereby changing the servo pressure present in the servo chamber towards the gas inlet pressure present in the gas inlet chamber and thereby decreasing or alternatively increasing flow between the gas inlet chamber and the gas outlet chamber; and when the stepper motor is driven in a second direction, the servo valve is moved in a second direction thereby increasing or opening the adjustable orifice, thereby changing the servo pressure present in the servo chamber towards the gas outlet pressure present in the gas outlet chamber and thereby increasing or alternatively decreasing flow between the gas inlet chamber and the gas outlet chamber.

3. The gas regulating device of claim 1, wherein:
the flow restriction valve is coupled to the first membrane support plate through a hollow valve stem; and
a servo flow channel provided by the hollow valve stem of the flow restriction valve, by the valve body of the servo valve and by the first membrane support plate, is coupled to the gas inlet chamber through the fixed orifice, to the gas outlet chamber through the adjustable orifice, and to the servo chamber.

4. The gas regulating device of claim 1, wherein the adjustable orifice comprises multiple flow channels, wherein the multiple flow channels are arranged in a circumferential pattern around an axis along which the flow restriction valve is axially movable.

5. A method for adjusting a position of a flow restriction valve in an axial direction between a gas inlet chamber and a gas outlet chamber in order to adjust the flow of gas between the gas inlet chamber and a gas outlet chamber, wherein the flow of gas impinges on the flow restriction valve and provides a force on the flow restriction valve in the axial direction, the method comprising:
using a stepper motor to adjust a position of a servo valve in a first direction, which decreases a size of an adjustable orifice between a servo chamber and the gas outlet chamber, wherein a fixed orifice is present between the servo chamber and the gas inlet chamber, wherein decreasing the size of the adjustable orifice changes a pressure in the servo chamber towards a gas inlet pressure in the gas inlet chamber and moves the flow restriction valve in a first axial direction thereby adjusting a flow of gas acting on the flow restriction valve in the axial direction between the gas inlet chamber and the gas outlet chamber, wherein the servo valve including a valve body attached to a membrane, wherein the membrane defines at least part of the servo chamber in which the servo pressure is present and the membrane positioned between a first membrane support plate and a second membrane support plate; and
using the stepper motor to adjust the position of the servo valve in a second direction, which increases the size of the adjustable orifice between the servo chamber and the gas outlet chamber, wherein increasing the size of the adjustable orifice changes the pressure in the servo chamber towards a gas outlet pressure in the gas outlet chamber and moves the flow restriction valve in a second axial direction thereby adjusting the flow of gas acting on the flow restriction valve in the axial direction between the gas inlet chamber and the gas outlet chamber,
wherein the fixed orifice is provided by an opening in the flow restriction valve, and the adjustable orifice is defined by the valve body of the servo valve and by the first membrane support plate.

6. The method of claim 5, wherein decreasing the size of the adjustable orifice changes the pressure in the servo chamber towards the gas inlet pressure in the gas inlet chamber and decreases the flow of gas between the gas inlet chamber and a gas outlet chamber.

7. The method of claim 6, wherein increasing the size of the adjustable orifice changes the pressure in the servo chamber towards the gas outlet pressure in the gas outlet chamber and increases the flow of gas between the gas inlet chamber and a gas outlet chamber.

8. A regulating device, comprising
a housing providing a first chamber in which a first pressure is present and a second chamber in which a second pressure is present, the housing further providing a flow restriction seat that defines a flow path between the first chamber and the second chamber that extends along a flow axis;
a flow restriction valve positioned in the housing, wherein the flow restriction valve comprises a valve body acting together with the flow restriction seat to adjust a flow from the first chamber into the second chamber, the flow restriction valve being movable along the flow axis of the flow path;
a servo valve positioned in the housing, wherein the servo valve comprises a valve body attached to a membrane, wherein the membrane defines at least part of a servo chamber in which a servo pressure is present, the membrane positioned between a first membrane support plate and a second membrane support plate, and wherein the servo chamber is connected to the first chamber though a fixed orifice, and the servo chamber is connected to the second chamber though an adjustable orifice; and
a stepper motor for moving the valve body of the servo valve, thereby adjusting the adjustable orifice, wherein the adjustment of the adjustable orifice causes a change of the servo pressure present in the servo chamber which is used to move the flow restriction valve to adjust the flow from the first chamber into the second chamber,
wherein the fixed orifice is provided by an opening in the flow restriction valve, and the adjustable orifice is defined by the valve body of the servo valve and by the first membrane support plate.

9. The regulating device of claim 8, wherein:
when the stepper motor is driven in a first direction, the valve body of the servo valve is moved in a first direction thereby decreasing or closing the adjustable orifice, thereby changing the servo pressure present in the servo chamber towards the first pressure present in the first chamber and thereby increasing or alternatively decreasing flow resistance over flow restriction valve and thereby decreasing or alternatively increasing flow over the flow restriction valve from the first chamber into the second chamber;
when the stepper motor is driven in a second direction, the valve body of the servo valve is moved in a second direction thereby increasing or opening the adjustable orifice, thereby changing the servo pressure present in the servo chamber towards the second pressure present in the second chamber and thereby decreasing or alternatively increasing flow resistance over flow restriction valve and thereby increasing or alternatively decreasing flow over the flow restriction valve from the first chamber into the second chamber.

10. The regulating device of claim 8, wherein:
the valve body of the flow restriction valve is coupled to the first membrane support plate through a hollow valve stem;
a servo flow channel provided by the hollow valve stem, by the valve body of the servo valve and by the first membrane support plate, is coupled to the first chamber though the fixed orifice, to the second chamber though the adjustable orifice, and to the servo chamber;

the fixed orifice is provided by an opening in the valve body of the flow restriction valve or by an opening in the hollow valve stem;

the adjustable orifice is defined by the valve body of the servo valve and by the first membrane support plate.

11. The regulating device of claim 10, wherein the servo chamber is connected to the servo flow channel between the fixed orifice and the adjustable orifice.

12. The regulating device of claim 10, wherein the valve body of the servo valve is moveable relative to the first membrane support plate by the stepper motor to thereby adjust the adjustable orifice.

13. The regulating device of claim 8, wherein the valve body of the servo valve is coupled to the stepper motor by a spindle, wherein the spindle converts a rotation of the stepper motor into a linear movement of the valve body of the servo valve.

14. The regulating device of claim 8, wherein the second pressure within the second chamber is measured by a sensor, and that the stepper motor is operated on basis on a pressure measured by the sensor in such a way that the second pressure within the second chamber is kept substantially constant.

15. The regulating device of claim 8, wherein the flow restriction valve and the servo valve are coaxially aligned.

16. The regulating device of claim 8, further comprising a safety shut-off valve positioned in the housing, wherein the safety shut-off valve comprises a valve body acting together with a valve seat provided by the housing, wherein a flow from the first chamber into the second chamber is prevented when the valve body of the safety shut-off valve is pressed against the valve seat provided by the housing, wherein a flow from the first chamber into the second chamber is possible when the valve body of the safety shut-off valve is lifted up from the valve seat provided by the housing.

17. The regulating device of claim 16, wherein the safety shut-off valve, the flow restriction valve and the servo valve are all coaxially aligned.

18. The regulating device of claim 16, wherein the flow restriction valve adjusts the flow from the first chamber into the second chamber when the valve body of the safety shut-off valve is lifted up from the valve seat provided by the housing.

* * * * *